UNITED STATES PATENT OFFICE.

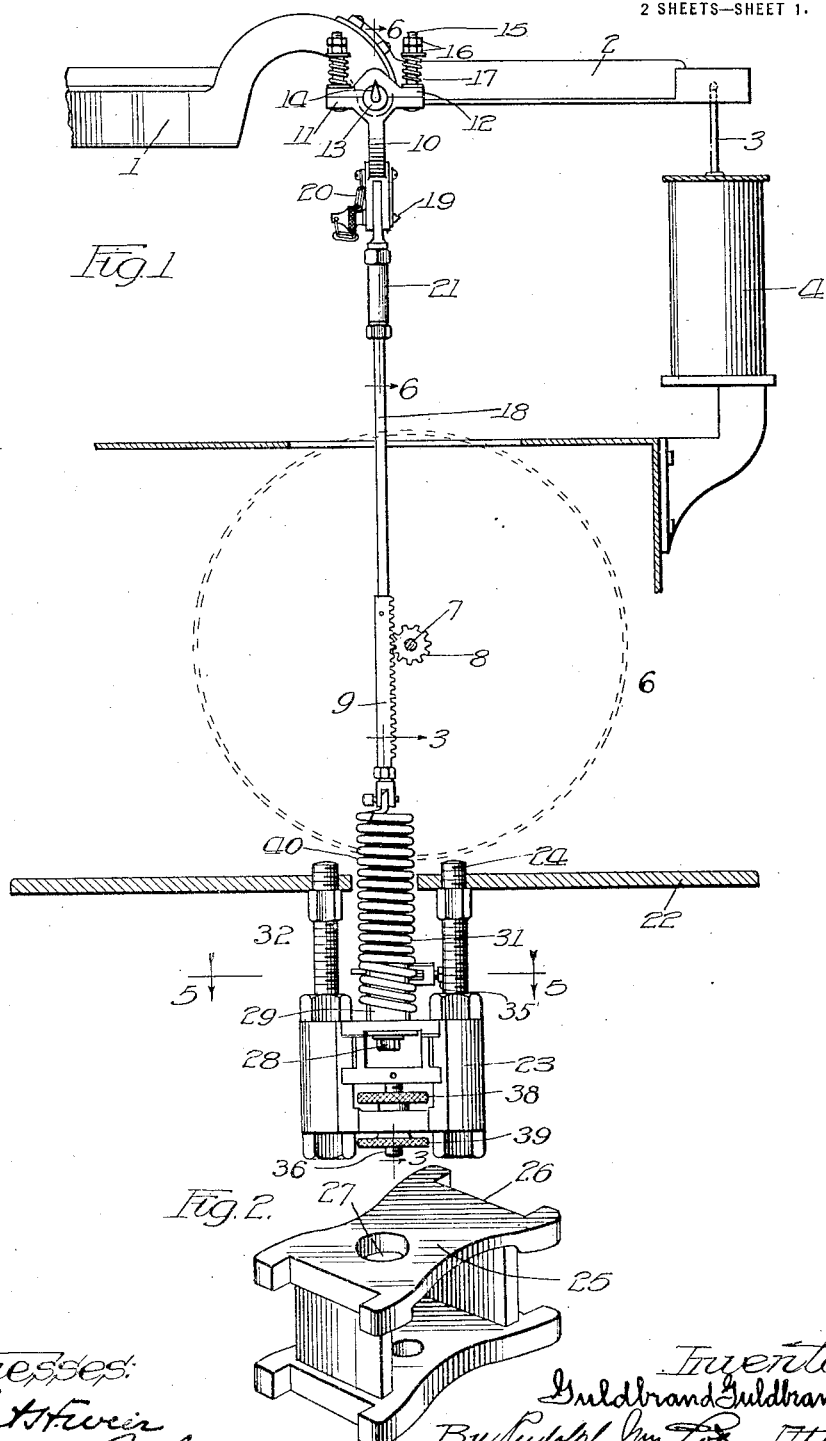

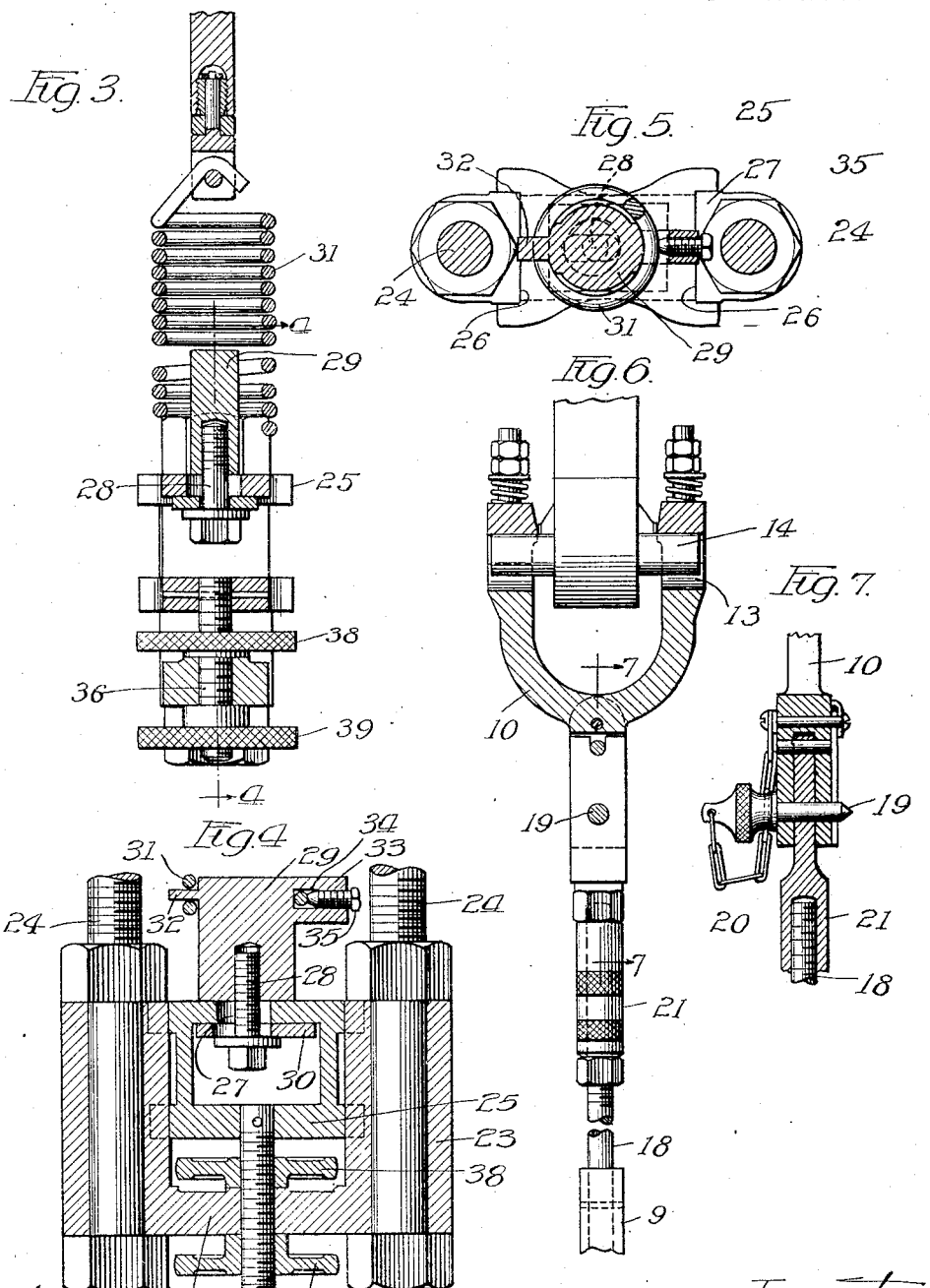

GULDBRAND GULDBRANDSEN, OF CHICAGO, ILLINOIS, ASSIGNOR TO STREETER AMET WEIGHING & RECORDING COMPANY, OF CHICAGO, ILLINOIS, A CORPORATION OF ILLINOIS.

WEIGHING-SCALE.

1,362,618.   Specification of Letters Patent.   Patented Dec. 21, 1920.

Application filed November 17, 1916. Serial No. 131,971.

*To all whom it may concern:*

Be it known that I, GULDBRAND GULDBRANDSEN, subject of the King of Denmark, residing at Chicago, in the county of Cook and State of Illinois, have invented certain new and useful Improvements in Weighing-Scales; and I do hereby declare the following to be a full, clear, and exact description of the invention, such as will enable others skilled in the art to which it appertains to make and use the same.

This invention relates to improvements in automatic beam-scales, also known as printing scales, and more particularly to railroad or track scales for weighing car-loads. The invention is particularly intended and adapted to track-scales adapted for weighing cars while the latter travel over the track-platform of the scale.

In scales of this character, it is obvious, the heavy load of the moving freight car is very suddenly imposed upon the weighing mechanism and places the latter, or parts thereof, under considerable strain besides tending to cause a swinging of the printing or recording mechanism between points removed from that which is occupied when the weight is at rest.

One object of the present invention is, therefore, to provide means for absorbing the shock resulting from the sudden imposition of load on the scale platform and thus to effect a gradual movement of the indicating and recording mechanism from inertia to position to register the true weight of the load.

A further object of the present invention is to provide means for easily and quickly effecting an adjustment of the scale to correct any error in the recording mechanism. That is to say, the invention has for a further object to provide means for positioning the indicating or recording mechanism to indicate zero on the dial or the like when the platform is empty of load.

Another object of the invention is to provide means for readily connecting and disconnecting the scale-beam and the recording mechanism.

Another object of the invention is to provide means for so relatively adjusting and connecting certain parts of the mechanism as to minimize strains thereon and friction resulting from the operation thereof.

The invention is fully illustrated in the accompanying drawings in its preferred embodiment. In said drawings:—

Figure —1— is a fragmentary view partly in section and partly in elevation showing the outer end portion of a scale beam and mechanism associated therewith for actuating a scale-recording mechanism to indicate weights as the latter is imposed on the scale platform which is omitted from illustration.

Fig. —2— is a detail perspective view of a carriage constituting a part of the adjusting mechanism for the scale.

Fig. —3— is a detail vertical longitudinal section on the line 3—3 of Fig. —1—.

Fig. —4— is a detail vertical longitudinal section on the line 4—4 of Fig. —3—.

Fig. —5— is a horizontal section on the line 5—5 of Fig. —1—.

Fig. —6— is a fragmentary detail vertical longitudinal section on the line 6—6 of Fig. —1—.

Fig. —7— is a detail longitudinal section on the line 7—7 of Fig. —6—.

In said drawings, 1 indicates the scale-beam of a platform-scale equipped with an extension member 2 to the outer end portion of which the plunger 3, operating in a dash-pot 4 is attached; said dash-pot performing the usual function of steadying the movements of the scale-beam under the influence of the imposition of a relatively heavy load upon the scale platform. The dash-pot 4 is mounted upon a rigid portion of the housing 5 for the recording mechanism of the scale which includes a printing wheel 6 indicated in dotted lines mounted on a shaft 7 suitably journaled in bearings supported in the housing 5. The shaft 7 is equipped with a spur pinion 8 meshing with a reciprocable rack bar 9. The latter is coupled at its upper end to the outer end of the scale beam 1 by means of a U-shaped member 10 equipped with cross-heads 11 at the ends of its arms, said cross-heads being provided with cap members 12. There are openings 13 between said cross-heads and said cap-members in which the scale pivots 14 are received. The cap members 12 are reciprocably movable relatively to the cross-heads 11, each of the latter being provided with two guide posts 15 threaded to receive nuts 16 between which and the opposed surface of the cap-member 12 helical compression springs 17 are interposed which maintain said cap member 12 normally compressed against its companion cross-head 11.

The said member 10 is provided with a bifurcated shank at its lower end to receive the upper end of a rod 18 carrying the rack-bar 9 and is coupled to said rod by means of a chain 20 thus permitting the recording mechanism to be uncoupled from the scale-beam and leaving the beam free for manual operation which may be desirable in case of accident to the recording mechanism. The said rod 18 is provided between its ends with means 21 of suitable construction for adjusting the length of said rod.

Mounted upon a rigid member 22 of the housing for the recording mechanism of the scale is a U-shaped guide member 23, the arms of which are hollow and receive studs 24 engaging in said member 22, the open space between said hollow arms being adapted to receive a reciprocably movable member 25 provided in its side edges with recesses 26 in which the guide ribs 27 on the inner opposed faces of the sleeves or hollow arms of the member 23 engage. The member 25 consists of a hollow box in the upper wall of which there is an elongated opening 27 through which a set-screw 28 engaging in a threaded opening in the lower end of a block 29 engages, said block or holder being adapted to be adjusted laterally relatively to the hollow arms of the member 23 and secured in its adjusted position by the engagement of the head of the bolt or set-screw 28 with a washer 30 interposed between the same and the lower face of the upper wall of the member 25. The said block or holder 29 is adapted to enter the lower end of a helical tension spring 31 connected at its upper end with the lower end of the rod 18 carrying the rack-bar 9. The said block 29 is provided at its upper end at diametrically opposite points with projections 32 and 33 respectively, the former being adapted to pass between two of the coils of the spring 31 and the projection 33 being provided with an opening 34 through which the spring is adapted to be threaded. A set-screw 35 engaging in the projection 33 is adapted to clamp the portion of the spring passing through the opening 34 rigidly against the post or block 29, thus determining the effective or working length of the spring 31.

In the lower wall of the member 25 is a central threaded opening in which one end of a downwardly projecting threaded post 26 is rigidly mounted. The latter passes freely through a central opening in the middle portion 37 of the member 23. The said threaded member receives a knurled lock-nut 38 which is adapted to bear upon the upper face of the part 37 and also receives an adjusting nut 39 bearing upon the lower face of the portion 37.

The rack-bar 9 is connected at its lower end with the end loop of the spring 31 by means of a non-adjustable swivel connection 40 which permits the slight rotation or rocking motion of said end loop as said spring 31 expands and contracts, and prevents corresponding torsional strain on said rack-bar which, obviously, would result in undue friction between said rack-bar 9 and the spur pinion 8.

The lateral adjustment of the member 29 relatively to the member 25 has for its object to adjust the position of the rack-bar 9 laterally relatively to the pinion 8 so as to be maintained properly engaged therewith along the pitch-lines of the respective teeth thereof, but not so as to increase the friction by exerting pressure in the direction of the shaft 7, and also to prevent the rack-bar from being positioned to face outwardly relatively to said spur pinion 8.

The member 25 may be adjusted by means of the nuts 38 and 39 when desired so that the recording mechanism of the scale will register zero when the scale-platform is devoid of load, and adjustment may be further carried out by adjusting the spring 31 relatively to the member 29 to increase or decrease the effective or working length of said spring.

The purpose of the springs 17 is to absorb the shock on the scale beam and rack-bar due to the sudden imposition of load on the scale platform. Thus, if a car loaded with forty tons of material suddenly imposes a very considerable portion of its weight on the scale platform as it enters upon the latter, there will be a very sudden jerk on the weighing mechanism and this jerk will obviously be communicated to the more delicate recording mechanism to the injury of the latter, the sudden strain due to initial movement of the wheel 6 from inertia being considerable, as will be obvious. The springs 17 absorb the shock and prevent undue strain particularly on the rack-bar 9 and pinion 8.

The upward movement of the rack-bar 9 against the action of the spring 31 effects correct indication of the weight of the load on the scale platform by means of the printing wheel. In order that the correct weight may be recorded it is obviously necessary that oscillation of said printing wheel be prevented. This is partially effected by the dash-pot 4 but the latter is incapable of preventing slight oscillation due to vibration caused by rough rails or rough car-wheels on the scale-platform or the vibratory movement of the car-body on its supporting springs during passage over the scale-platform. The connections between the scale-platform and the scale-beam are all of a non-yielding nature so that the latter is sensitive to all things affecting the scale-platform.

The springs 17 are adapted to absorb shocks due to sudden impositions of loads on the scale-platform and also to take up the vibrations of the scale-beam caused by the passage of the car or other moving load over the scale-platform thus permitting the printing-wheel to remain substantially at rest in such position as to correctly record the weight of the load at the proper instant.

The use of the springs 17 necessitates that the movement of the scale beam shall be greater to an extent equal to the maximum compression of said springs. That is to say, if the normal movement of the scale beam is one inch to forty thousand pounds and the springs 17 are capable of one quarter inch maximum compression, then the total movement of the scale beam must be one and one-quarter inch to forty thousand pounds maximum weight.

By means of my invention adjustment may be easily, quickly and accurately effected not only to secure correct weight indications, but also to avoid unnecessary friction, strain and wear on the weighing, indicating and recording mechanism.

While the invention is particularly adapted to track-scales, it may obviously be readily adapted to other beam scales without departing from the invention as defined in the appended claims.

While the construction illustrated and described is particularly adapted for absorbing shocks, as above described, it is, perhaps to an even greater extent, efficient to absorb the vibrations due to travel of the car over the scale beam which the ordinary dash pot employed in connection with the scales of this character is incapable of absorbing.

I find that by means of my said invention the recording mechanism of the scale remains stationary from the time that the car is completely disposed upon the track to the time at which it leaves the same, thus enabling a true record of the weight of the car to be obtained.

I claim as my invention:

1. In a beam-scale, weight-indicating means including a rotatable member, a reciprocable member operatively geared thereto and connected at one end with the scale beam for actuating said rotatable member, a carriage, guides upon which the carriage may be moved, a fixed member, an adjustable member carried by the fixed member for positioning said carriage at any point between the limits of its movement, and a spring connected at opposite ends with said carriage and said reciprocable member for normally maintaining the latter and said scale-beam positioned to cause said weight-indicating means to indicate zero when the scale-platform is free of load.

2. In a beam-scale, weight indicating means including a rotatable member equipped with a pinion, a reciprocable rack-bar geared thereto and connected with the scale-beam, a spring connected with the rack-bar for maintaining the said rotatable member normally positioned to indicate zero, a carriage connected with the other end of said spring, a fixed cross-bar, guides for said carriage on said cross-bar for holding the carriage against rotation on the axis of said rack-bar, and manually operable means for adjusting the position of said carriage on said guides.

3. In a beam-scale, weight-indicating means including a rotatable member equipped with a pinion, a reciprocable rack-bar geared thereto and connected with the scale-beam, a spring connected with the rack-bar for maintaining the said rotatable member normally positioned to indicate zero, a carriage connected with the other end of said spring, guides for said carriage for holding the same against rotation on the axis of said rack-bar, means permitting laterally adjusting the point of connection of said spring with said carriage to position the pitch line of said rack-bar relatively to the pitch diameter of said pinion and manually operable means whereby the position of said carriage can be adjusted longitudinally in the guides.

In testimony whereof I have signed my name in presence of two subscribing witnesses.

GULDBRAND GULDBRANDSEN.

Witnesses:
M. M. BOYLE,
C. W. KINCH.